(12) United States Patent
Swope et al.

(10) Patent No.: US 12,229,996 B2
(45) Date of Patent: Feb. 18, 2025

(54) SYSTEMS AND METHODS FOR CAMERA CALIBRATION VIA DUAL-MODE MATS

(71) Applicant: ZEBRA TECHNOLOGIES CORPORATION, Lincolnshire, IL (US)

(72) Inventors: Charles Burton Swope, Coral Springs, FL (US); Matthew B. Hayes, Wheaton, IL (US); Andrea Mirabile, London (GB)

(73) Assignee: Zebra Technologies Corporation, Lincolnshire, IL (US)

( * ) Notice: Subject to any disclaimer, the term of this patent is extended or adjusted under 35 U.S.C. 154(b) by 142 days.

(21) Appl. No.: 18/072,534

(22) Filed: Nov. 30, 2022

(65) Prior Publication Data
US 2024/0177345 A1    May 30, 2024

(51) Int. Cl.
| | | |
|---|---|---|
| G06T 7/80 | (2017.01) | |
| G06Q 20/20 | (2012.01) | |
| H04N 23/56 | (2023.01) | |
| H04N 23/66 | (2023.01) | |
| H04N 23/90 | (2023.01) | |

(52) U.S. Cl.
CPC .............. *G06T 7/80* (2017.01); *G06Q 20/203* (2013.01); *H04N 23/56* (2023.01); *H04N 23/66* (2023.01); *H04N 23/90* (2023.01)

(58) Field of Classification Search
None
See application file for complete search history.

(56) References Cited

U.S. PATENT DOCUMENTS

| | | | |
|---|---|---|---|
| 2020/0074373 A1 | 3/2020 | Adato et al. | |
| 2021/0342588 A1 | 11/2021 | Davis et al. | |
| 2021/0374836 A1* | 12/2021 | Bronicki | G06Q 30/0201 |
| 2022/0083959 A1* | 3/2022 | Skaff | H04N 7/18 |
| 2022/0106174 A1 | 4/2022 | High et al. | |

OTHER PUBLICATIONS

International Search Report and Written Opinion for International Application No. PCT/US2023/34659 mailed on Feb. 28, 2024.

* cited by examiner

*Primary Examiner* — Samira Monshi

(57) ABSTRACT

Systems and methods for calibrating a camera using a calibration system are provided. The calibration system includes a mat, a camera, and a controller. The systems and methods include the controller configuring the mat to operation in an illumination mode in which the mat energizes one or more LEDs to form an illumination pattern. The controller receives image data generated by the camera that features the illumination pattern. The controller analyzes the image data to derive heading data for the camera and sets the camera heading data to be the derived heading data.

22 Claims, 11 Drawing Sheets

178

$$\begin{pmatrix} 255, & 255, & 255, & 0, & 0, & 255, & 255, & 255, \\ 255, & 255, & 255, & 0, & 0, & 255, & 255, & 255, \\ 255, & 255, & 255, & 0, & 0, & 255, & 255, & 255, \\ 0, & 0, & 0, & 0, & 0, & 0, & 0, & 0, \\ 255, & 255, & 255, & 255, & 255, & 255, & 255, & 255, \\ 255, & 255, & 255, & 255, & 255, & 255, & 255, & 255, \\ 255, & 255, & 255, & 255, & 255, & 255, & 255, & 255, \end{pmatrix}$$

SYSTEMS AND METHODS FOR CAMERA CALIBRATION VIA DUAL-MODE MATS

BACKGROUND

Frictionless checkout systems typically rely on cameras positioned throughout the venue to detect which items to associate with shoppers. For example, if a shopper picks a product off a shelf, the frictionless checkout system may add the product to an inventory of items associated with the shopper. As a result, when the frictionless checkout system detects that the shopper has left the venue, the system may automatically process the purchase of any items in the shopper's inventory.

To detect when shoppers pick items off venue shelves, venue operators may deploy pressure mats configured to sense a change in pressure. These pressure mats conventionally include an array of pressure sensors to more precisely detect a location associated with the change in pressure. As a result, the frictionless checkout system may identify a refined area of interest within the image data generated by the cameras to analyze and identify the product picked up by the shopper and/or confirm that the shopper picked up an item assigned to the location by a planogram.

As part of configuring a frictionless checkout system, the cameras positioned throughout the venue need to be calibrated to ensure that the frictionless checkout system knows the correlation between the pixel location and venue location. Typically, the calibration process involves detecting illumination events at known locations of the venue.

However, conventional pressure mats do not include illumination assemblies. As a result, a venue operator configuring a conventional frictionless checkout system needs to install standalone illumination systems to calibrate the cameras. For example, the venue operator may install shelf-mounted lighting and/or under-shelf illumination systems. These solutions suffer several drawbacks. Notably, these standalone illumination solutions require their own power sources, mounting structures, and/or hardware assemblies that result in a higher cost of operation, longer configuration times, and/or less space available for products.

Accordingly, to overcome at least the aforementioned challenges, there is a need for improved calibration techniques using dual-mode pressure-sensing and illumination mats.

SUMMARY

In a first embodiment, the present invention is a system for calibrating a camera. The system includes (i) a mat; (ii) a camera having first heading data and a field of view featuring the mat; and (iii) a controller coupled to the mat, and the camera, the controller being configured to perform a calibration routine to calibrate the camera. The calibration includes (1) controlling the mat to energize one or more light emitting diodes (LEDs) to generate an illumination pattern, (2) receiving image data captured by the camera that features the illumination pattern, (3) deriving second heading data based on a relative position of the camera and the mat and a relative position of the illumination pattern within the image data; and (4) setting the first heading data of the camera to the second heading data.

In another embodiment, the present invention is a method for calibrating a camera via a calibration system that includes (1) a mat; (2) a camera having first heading data and a field of view featuring the mat; and (3) a controller coupled to the mat, and the camera. The method includes (a) controlling, via the controller, the mat to energize one or more light emitting diodes (LEDs) to generate an illumination pattern; (b) receiving, via the controller, image data captured by the camera that features the illumination pattern; (c) deriving, via the controller, second heading data based on a relative position of the camera and the mat and a relative position of the illumination pattern within the image data; and (d) setting, via the controller, the first heading data of the camera to the second heading data.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
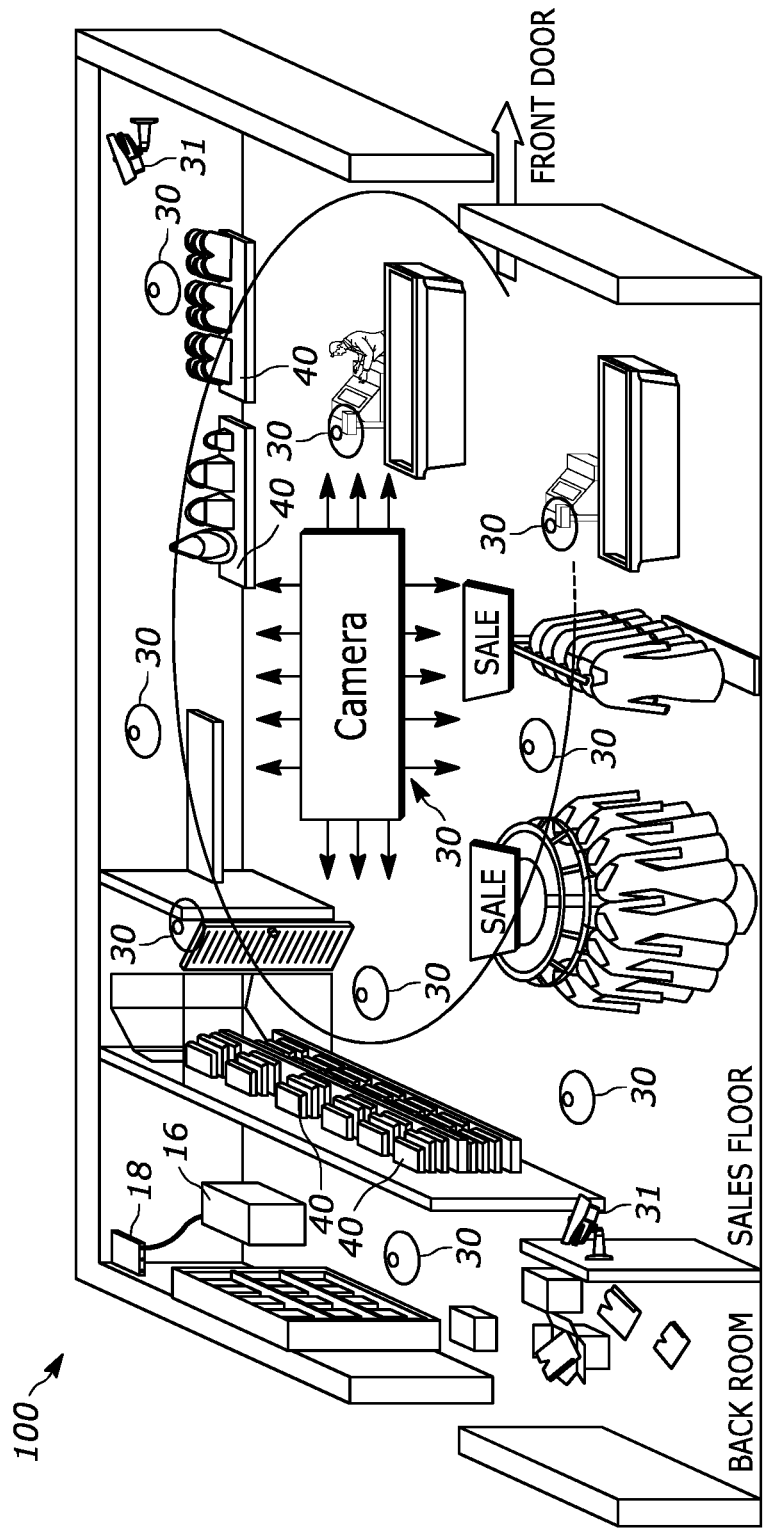
FIG. 1 illustrates a perspective view of an example venue that includes a product monitoring system, as disclosed herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

FIG. 1 is a perspective view, as seen from above, of a venue 100 illustrating an arrangement for which a product tracking system (e.g., a frictionless checkout system) within the venue 100 is deployed to facilitate tracking objects within the venue 100. Although the example venue 100 is a retail venue, other types of venues (such as a warehouse, a transport center, an airport, a stadium, a museum, and so on) are envisioned. In the example embodiment of FIG. 1, the venue 100 includes a backroom that has a central controller 16. In other embodiments, the central controller 16 may be located elsewhere on or proximate to the venue 100. The central controller 16 may be operated by venue personnel and/or personnel associated with the RFID system.

The central controller 16 may comprise a networked host computer or server. The central controller 16 may be connected to a plurality of cameras 30, 31 positioned throughout the venue 100 via the network switch 18. For example, the plurality of cameras may include ceiling-mounted cameras 30 and wall-mounted cameras 31. The plurality of cameras 30, 31 may be positioned at a fixed location and/or support pan/tilt/roll control. Additionally, the venue 100 includes a plurality of dual-mode pressure-sensing and illumination mats 40 ("dual-mode mats" or "mats") upon which items are placed. In some embodiments, the venue 100 includes multiple central controllers 16 and/or switches 18 connected to respective subsets of the cameras 30, 31 and dual-mode mats 40 associated with the venue 100.

Each of the cameras 30, 31 and dual-mode mats 40 may be in wired or wireless electronic communication with the central controller 16 via the network switch 18 to support data communications therebetween. For example, in some embodiments, the cameras 30, 31 and dual-mode mats 40 may be connected via Category 5 or 6 cables and use the Ethernet standard for wired communications. In other embodiments, the cameras 30, 31 and dual-mode mats 40 may be connected wirelessly, using a built-in wireless transceiver, and may use the IEEE 802.11 (WiFi) and/or Bluetooth standards for wireless communications. Other embodiments may include cameras 30, 31 and dual-mode mats 40 that use a combination of wired and wireless communication.

Figure 2:
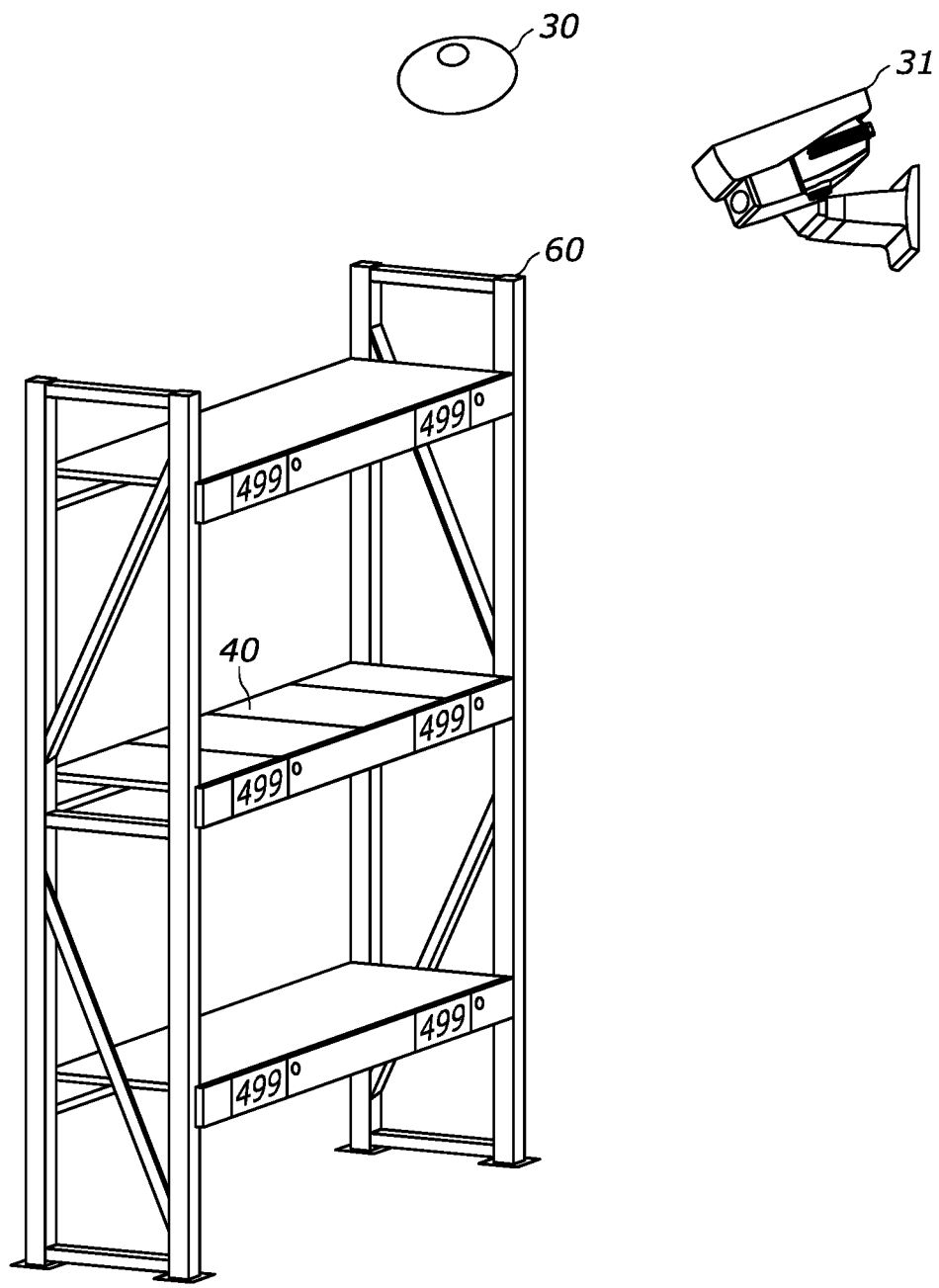
FIG. 2 illustrates a perspective view of a shelf that includes a dual-mode mat being monitored by the product monitoring system, as disclosed herein.

With simultaneous reference to FIG. 2, illustrated is a perspective view of a shelf 60 that includes a dual-mode mat 40 being monitored by the product monitoring system. More particularly, the perspective view depicts a scenario during the initial configuration of the cameras 30, 31 when no products are placed upon the shelf 60. Prior to initiating the configuration process, the central controller 16 may be programmed with position data (e.g., X, Y, and Z coordinates) for the shelf 60, the cameras 30, and/or the mat 40 with respect to the venue 100. For example, the position data associated with the venue may indicate a range of X-Y coordinates associated with the shelf 60, a Z coordinate for the height of each tier, and an arrangement of mats 40 on each tier. In the illustrated scenario, the position data associated with the mat 40 may indicate that the mat 40 is located on the second tier and second position of the shelf 60.

During the configuration, the central controller 16 derives calibration data associated with the cameras 30, 31 based on the known location of the mat 40. For example, the calibration data may indicate a correspondence between positions within the venue 100 and the pixels of image data produced when the cameras 30, 31 are configured with particular pan/tilt/roll settings. Accordingly, during operation, when the mat 40 indicates a change in pressure data (e.g., when an object is removed from the dual-mode mat 40), the central controller 16 may compare the current pan/tilt/roll of the cameras 30, 31 to the calibration data to identify cameras that include the location of the mat 40 within the field of view (FOV) and determine which portions (e.g., which pixels) of the images provided by the identified cameras include image data representative of the object.

To initiate the calibration process, the central controller 16 may instruct the mat 40 to illuminate in accordance with a pre-determined illumination pattern. In the illustrated scenario, the illumination pattern is a solid illumination pattern where each light emitting diode (LED) of the mat 40 is illuminated. In other scenarios, the illumination pattern may include a bullseye pattern or other pattern that enables the central controller 16 to identify the position of an individual LED and/or a collection of LEDs of the mat 40 within the image data provided by the cameras 30, 31. In these scenarios, the central controller 16 may derive the calibration data based on the known position the identified LED of the mat 40. As a result, the central controller 16 can calibrate the cameras 30, 31 simultaneously and with greater accuracy than conventionally possible.

It should be appreciated that while the illustrated scenario depicts an initial calibration of the cameras 30, 31 where there are no products on the shelf 60, in other scenarios, similar techniques may be applied after stocking the shelf 60 to recalibrate the cameras 30, 31. To this end, over time the camera mountings may shift slightly and/or the mechanical components that control the pan/tilt/roll of the camera may change resistivity due to wear and tear. This may cause the calibration data to become inaccurate, thereby requiring recalibration of recalibrate the cameras 30, 31.

In some scenarios, the central controller 16 may initiate a recalibration process when there are products on the shelf 60. In the re-calibration scenario, the central controller 16 may first determine a portion of the mat 40 that is not obscured by the products placed upon the mat 40 and generate an illumination pattern using the unobscured LEDs. As a result, the central controller 16 is able to recalibrate the cameras 30, 31 in a manner that accounts for the dynamic conditions of the venue 100.

Figure 3A:
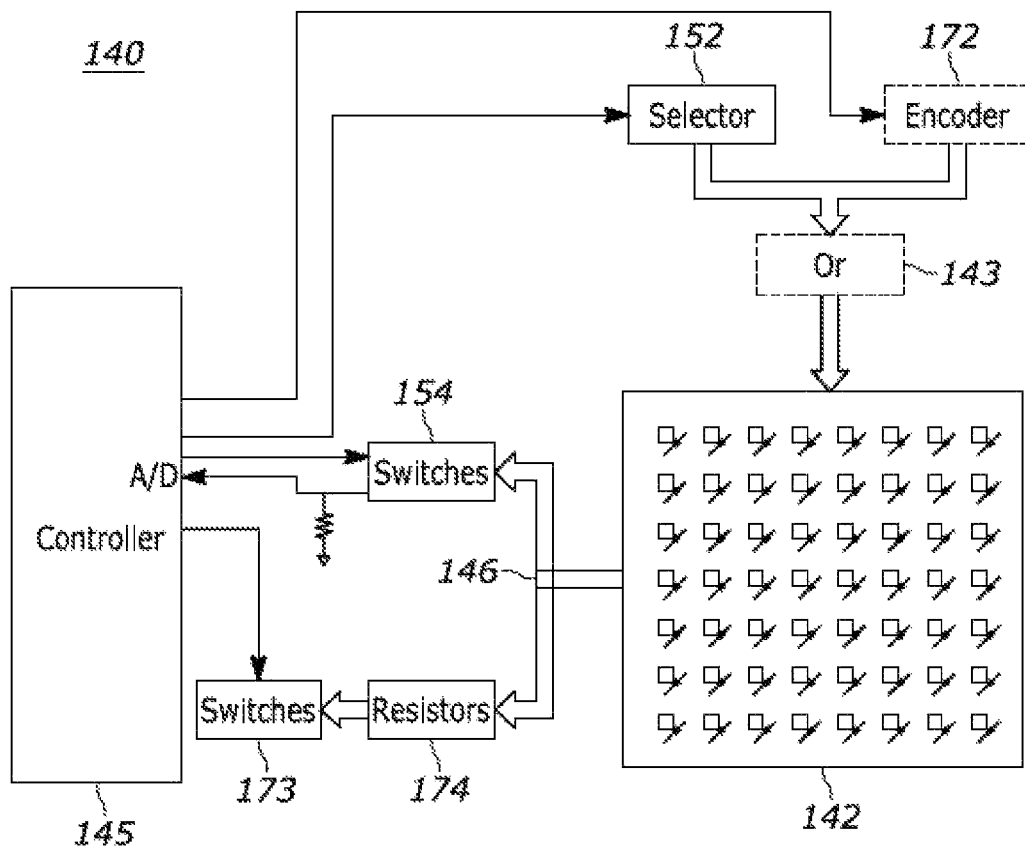
FIG. 3A illustrates an example schematic diagram of a dual-mode mat, as disclosed herein.

FIG. 3A is an example schematic diagram of a dual-mode mat 140 (such as any of the mats 40 described with respect to FIG. 1 or 2) that enables the improved calibration and/or recalibration techniques described herein. As illustrated, the dual-mode mat 140 includes a surface matrix 142. The surface matrix 142 may be a surface upon which items associated with the venue 100 are placed. Additionally, the surface matrix 142 houses a matrix that includes both a pressure sensor and an LED at each matrix position.

The dual-mode mat 140 also includes a selector 152 for selectively controlling which position in the surface matrix 142 is active. To this end, the surface matrix 142 may include a microcontroller (e.g., an Arduino microcontroller) that includes an input via which selector 152 is electrically connected to the surface mat 142. In response, the microcontroller of the surface matrix 142 completes an electrical path that flows from a power supply through the active position.

Figure 3B:
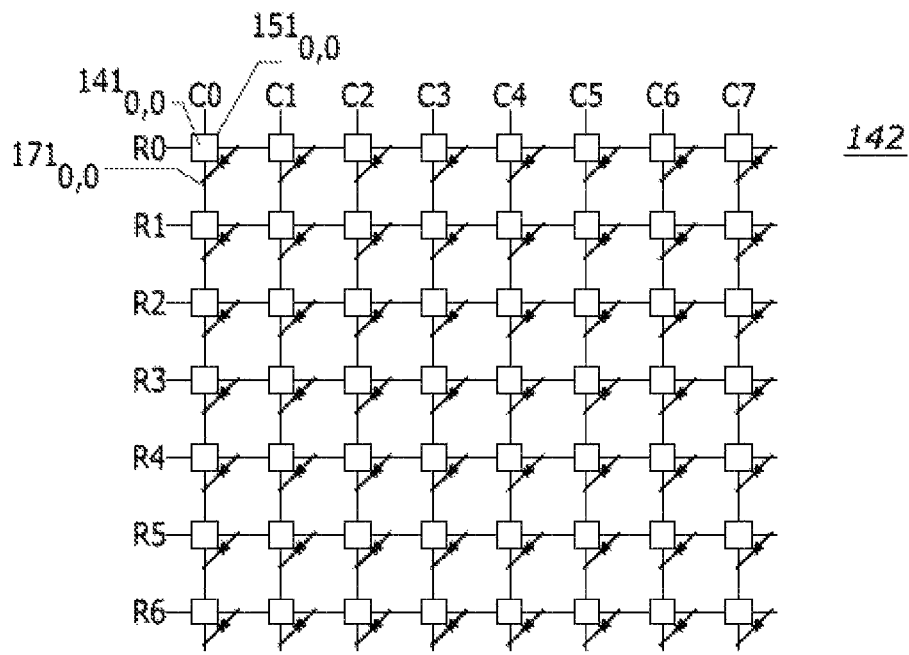
FIG. 3B illustrates an example schematic diagram of a surface matrix included within a dual-mode mat, as disclosed herein.

With simultaneous reference to FIG. 3B, illustrated is an example schematic diagram of the surface matrix 142 of the dual-mode mat 140. The surface matrix 142 may include a plurality of row wires (e.g., R0 to R6) and a plurality of column wires (e.g., C0 to C7). As illustrated, the row wires and the column wires form intersection points 141 that represent the matrix positions of the surface matrix 142. At each intersection point 141, the surface matrix 142 includes a pressure sensor 151 and an LED 171 electrically coupled in parallel to the corresponding row wire and column wire.

In some embodiments, the pressure sensors 151 are high impedance pressure sensors (e.g., pressure sensors having an impedance of approximately 20,000 ohms to approximately 100,000 ohms). Accordingly, when the surface matrix 142 completes the electrical path to the intersection point 141 and runs a current in the forward-biased direction, the LED 171 will have significantly lower impedance than the pressure sensor 151. As a result, the current will mainly flow through the LED 171 causing the LED 171 to illuminate. On the other hand, when the surface matrix 142 completes the electrical path to the intersection point 141 and runs a current in the reverse-biased direction, the LED 171 acts as an open switch, causing the current to flow through the pressure sensor 151. As a result, the pressure sensor 151 may provide an output voltage signal indicative of a pressure exerted on the mat 140. The correspondence between the voltage signal and sensed pressure is typically noted in the product specifications associated with the pressure sensors 151.

During operation, a controller 145 controls the dual-mode mat 140 to operate in either (i) a pressure-sensing mode during which the controller 145 obtains pressure data from the pressure sensors 151, or (ii) an illumination mode during which the LEDs 171 are illuminated in accordance with an illumination pattern. Starting with the pressure-sensing mode, the controller 145 may be configured to control the selector 152 in tandem with a switch bank 154 to scan the outputs of each of the pressure sensors 151 within the surface matrix 142. For example, the controller 145 may maintain a matrix of sensed pressure values corresponding to each of the pressure sensors 151. Accordingly, the controller 145 may configure the selector 152 and the switch bank 154 to complete an electrical path from a power source of the surface matrix 142 through a pre-determined pressure sensor 151 and the switch bank 154 and to an analog to digital (A/D) input port of the controller 145. It should be appreciated that the surface matrix 142 may configure the current in the completed circuit to flow in a reverse-biased direction with respect to the LEDs 171 thereby causing the current to flow through the pressure sensors 151. Based on the sensed voltage levels at the input port, the controller 145 may update the pressure values for the scanned pressure sensors 151 in the maintained matrix of pressure values.

When updating the pressure values, the controller 145 may detect a change in pressure that exceeds a threshold value for alerting a central controller (such as the central controller 16 of FIG. 1 or 2). In one example, the threshold is approximately 80% of the maximum resistance of a variable resistor in the pressure sensors 151. For a 3.3V system with pressure sensors that have a maximum resistance of approximately 100,000 ohms, the voltage threshold for detecting a pressure change at the A/D input port of the controller 145 is about 0.66V. If the pressure value reported by a pressure sensor 151 decreased by a threshold amount, then an item was likely removed from the mat 140. On the other hand, if the pressure value reported by a pressure sensor 151 increased by a threshold amount, then an item was likely placed onto the mat 140. In some embodiments, the controller 145 may generate and transmit an event to the central controller 16 that includes an identifier of the mat 140 and/or the particular pressure sensor(s) 151 that exhibited the change in pressure values. The central controller 16 may then query a planogram of the venue 100 to identify a physical location of the mat 140 and/or the identified pressure sensor 151 to obtain image data of the physical location captured by the cameras 30, 31.

Turning to the illumination mode, the controller 145 may be configured to control switches 173 and/or resistor bank 174 to adjust operation of the LEDs 171 of the surface matrix 142 in accordance with an illumination pattern. In some embodiments, the illumination pattern indicates a simple binary or Boolean flag as to whether each of the LEDs 171 should be enabled or disabled. In these embodiments, the controller 145 may instruct the selector 152 to cyclically select the intersection points 141 corresponding the enabled LEDs 171 in the illumination pattern. The microcontroller, in turn, completes an electrical path that flows from a power supply through the intersection point 141 to drive the enabled LEDs 171. It should be appreciated that in the illumination mode, the current flows through the surface matrix 142 in a forward-biased direction with respect to the LEDs 171 thereby by causing the LEDs 171 to illuminate.

In other embodiments, the illumination pattern may include more complex illumination features. As one example, the illumination pattern may indicate an illumination intensity for the LEDs 171. As another example, the LEDs 171 may be multi-color, voltage-variable LEDs that are configurable to generate different colored illumination based on the input voltage. Accordingly, in these embodiments, the illumination pattern may include a color value (e.g., a vector of red, green, and blue values) and/or an intensity value (e.g., a value from 0 to 255).

In these embodiments, a shift register (e.g., the selector 152) may be unable to sufficiently control the LEDs 171. Instead, the mat 140 may include an encoder 172 to encode the intensity and/or color settings of the illumination pattern into control signals for controlling the microcontroller of the surface matrix 142. For example, the encoder 172 may be a TI 74HC4051 or a custom ASIC or FPGA encoder that preferably includes a tri-state output. Accordingly, in these embodiments, the mat 140 may include an OR gate 143 configured to receive the control signals from either the selector 152 or the encoder 172. While the instant disclosure uses a different name to refer to the encoder 172, in these embodiments, the encoder 172 may nonetheless be considered a "selector."

Additionally, the mat 140 includes a resistor bank 174 controlled in tandem with the selector 152 and/or the encoder 172 to control the illumination provided by the enabled LEDs 171. In embodiments that support simple illumination patterns, the controller 145 may set switches in a switch bank 173 to control an overall amount of resistance exhibited by the resistor bank 174 in the circuit between the selector 152, the surface matrix 142 and the resistor bank 174. In particular, the controller 145 may control the switch bank 173 such that the resistance of the resistor bank 174 limits the current of the circuit to be within an operating range of the LEDs 171 and/or below a pre-determined maximum current level.

In embodiments with more complex illumination patterns that indicate an illumination intensity, the resistor bank 174 may include variable gain resistors instead of fixed-gain resistors. Accordingly, the controller 145 may set the resistance of the variable-gain resistors to adjust the current provided to the LEDs 171 to effect the indicated illumination intensity. In some embodiments with illumination patterns that indicate an illumination color, the resistor bank 174 may include a resistor for each of the red, blue, and green channels. Additionally or alternatively, the resistor bank 174 may include one or more controllable switches (e.g., MOSFET transistors) for modulating the resistance in accordance with the color settings. That is, the resistor bank 174 may implement pulse-width modulation (PWM) techniques with a duty cycle configured to change the effective voltage supplied to the LEDs 171. Because the LEDS 171 may be multi-color, voltage variable LEDs, the change in the effective voltage causes the LEDs 171 to change their illumination color. As a result, the controller 145 may control the PWM duty cycle of the resistor bank to implement the color settings of the illumination pattern.

As illustrated, the mat 140 also includes a switch 146. The controller 145 may operate the switch 146 to connect the surface matrix 142 to the switch bank 154 when operating in the pressure-sensing mode and to connect the surface matrix 142 to the resistor bank 174 when operating the illumination mode.

Figure 3C:
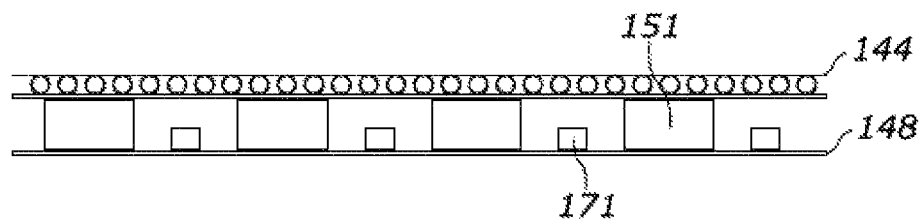
FIG. 3C illustrates a side view of a dual-mode mat, as disclosed herein.

Turning to FIG. 3C, illustrated is a side view of the dual-mode mat 140, as disclosed herein. More particularly, illustrated is a side view of the surface matrix 142 of the dual-mode mat 140.

As illustrated the surface matrix 142 includes a light permeable layer upon 144 upon which items are placed. The light-permeable nature of the layer 144 enables the illumination provided by the LEDs 171 to pass through the layer 144 and be detectable by the cameras 30, 31 of the venue 100. Additionally, the illustrated surface matrix 142 includes a printed circuit board (PCB) 148 upon which the pressure sensors 151 and the LEDs 171 are mounted. The PCB 148 may also include the plurality of row wires and column wires that connect to the pressure sensors 151 and the LEDs 171.

As illustrated, the height of the LEDs 171 is less than the height of the pressure sensors 151 such that the light permeable layer 144 rests upon the pressure sensors 151, and not the LEDs 171. To this end, if the LEDs 171 were to have approximately the same height as the pressure sensors 151, the LEDs 171 would support some of the pressure applied by items placed upon the surface 144 resulting in inaccurate pressure measurements by the pressure sensors 151. Additional description of alternative embodiments of a dual-mode mat is provided in US Application, the entire disclosure of which is hereby incorporated by reference.

Figure 4A:
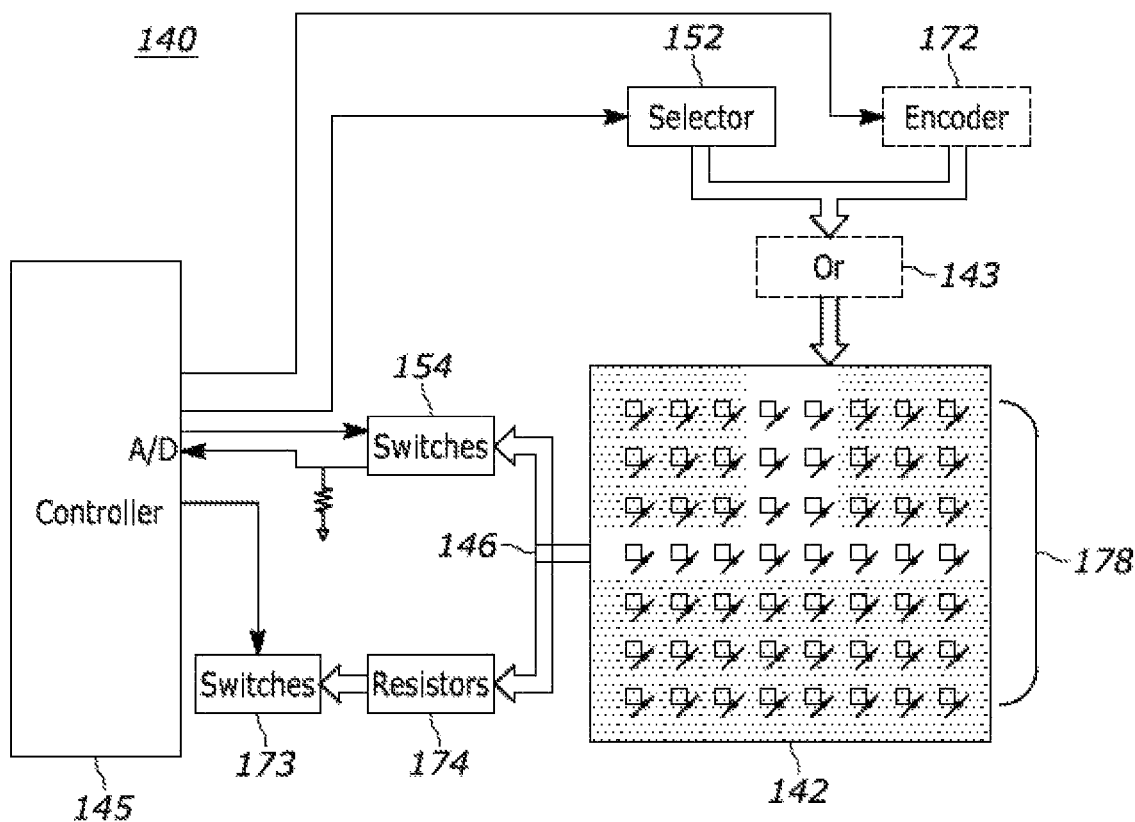
FIG. 4A illustrates an example view of a dual-mode mat being configured to illuminate in accordance with an illumination pattern, as disclosed herein.

FIG. 4A illustrates an example view of the dual-mode mat 140 being configured to illuminate in accordance with an illumination pattern 178, as disclosed herein. As illustrated, the illumination pattern 178 may form three rectangles: an upper left rectangle, an upper right rectangle, and a lower rectangle.

Figures 4B, 5:
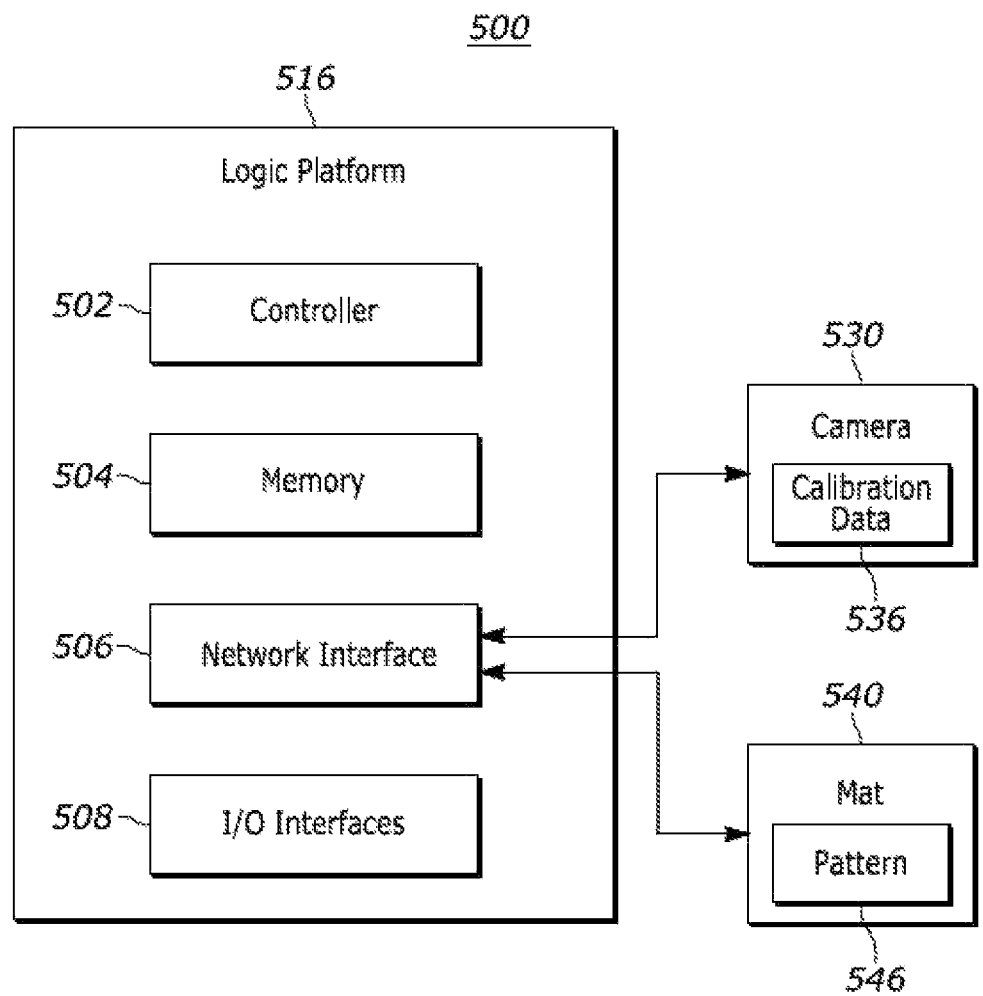
FIG. 4B illustrates an example data structure for an illumination pattern, as disclosed herein.
FIG. 5 is a block diagram representative of a camera calibration system and the various components thereof.

With simultaneous reference to FIG. 4B, illustrated is an example data structure for the illumination pattern 178. As illustrated, the data structure for the illumination pattern 178 may be a matrix of values that correspond to the LEDs 171 of the surface matrix 142 in a 1:1 relationship. For example, matrix position (0,0) of the data structure may correspond to the LED $171_{0,0}$. Accordingly, to cause the LEDs 171 to illuminate in accordance with the illumination pattern 178, the controller 145 may analyze the illumination pattern 178 to identify the illumination settings for each of the LEDs 171 and configure the selection 152 and/or the encoder 172 to control the surface matrix 142 in accordance therewith. More particularly, the controller 145 may configure the resistor bank 174 and the switches 173 in accordance with the illumination settings indicated by the illumination pattern 178.

In the illustrated example, the illumination pattern 178 represents a single-color illumination pattern. Accordingly, each matrix position only corresponds to a single value—illumination intensity. In alternate embodiments that include multi-color illumination patterns, each matrix position may include a vector of values that correspond to a red intensity value, a green intensity value, and a blue intensity value to use when configuring the resistance of the red, green, and blue channel resistors of the resistor bank 174. In still other embodiments, the matrix position may include a binary or Boolean variable indicating whether the LED 171 at the corresponding position 141 is to be enabled or not.

As disclosed herein, the controller 145 may store the illumination pattern 178 in a memory. For example, the controller 145 may have received the illumination pattern 178 from the central controller 16. In some embodiments, the controller 145 stores multiple illumination patterns in the memory. To this end, different illumination patterns may be designed for different purposes. For example, a first illumination pattern may be designed to facilitate a camera calibration process and a second illumination pattern may be designed to facilitate an assisted restocking application. Additionally, in some embodiments, the controller 145 may dynamically generate and store an illumination pattern based upon pressure data sensed during the pressure-sensing mode.

FIG. 5 is a block diagram representative of a camera calibration system 500 and the various components thereof capable of implementing the techniques described herein. The camera calibration system 500 may be implemented at the venue 100. The camera calibration system 500 includes a logic platform 516 (such as the central controller 16) that functions as a processing platform capable of executing instructions to, for example, implement operations of the example methods described herein (including those described with respect to the central controller 16), as may be represented by the flowcharts of the drawings that accompany this description. Example processing platforms include, for example, implementing operations of the example methods described herein via field programmable gate arrays (FPGAs) and application specific integrated circuits (ASICs).

The logic platform 516 includes a controller 502 that includes a processor such as, for example, one or more microprocessors, controllers, and/or any suitable type of processor. The logic platform 516 includes memory (e.g., volatile memory, non-volatile memory) 504 accessible by the processor 502 (e.g., via a memory controller). The example controller 502 interacts with the memory 504 to obtain, for example, machine-readable instructions stored in the memory 504 corresponding to, for example, the operations represented by the flowcharts of this disclosure. Additionally or alternatively, machine-readable instructions corresponding to the example operations described herein may be stored on one or more removable media (e.g., a compact disc, a digital versatile disc, removable flash memory, etc.) that may be coupled to the logic platform 516 to provide access to the machine-readable instructions stored thereon.

The example memory 504 includes a portion thereof dedicated to storing a planogram of the venue. The planogram may indicate the three dimensional physical arrangement of the items at the venue. For example, the planogram may indicate the physical location of product shelves, storage shelves, point-of-sale terminals, promotional displays, aisle endcaps, etc. If a product shelf or other venue surface includes a dual-mode mat 540 (such as the mats 40, 140) placed thereon, the planogram may also include an indication of a mat identifier and mat location with respect to the shelf. As a result, the logic platform 516 is able to query the planogram to identify the physical position of LEDs included in mats 540 at the venue.

Additionally, the planogram may include information indicating a location on the product shelves at which particular items are to be stocked. For instance, the planogram may indicate that ACME cereal bars are to be stocked on shelf 60, on the second tier, and in the third row of items from the left end. Accordingly, the logic platform 516 can analyze image data generated by cameras 530 (such as the cameras 30, 31) to verify that objects are correctly stocked upon the dual-mode mats 540. While the foregoing describes the planogram being stored at the memory 504 of the logic platform 516, in other embodiments, the planogram may be stored at an external database. Accordingly, any reference to "planogram database" herein envisions the planogram being stored at the memory 504 of the logic platform 516 and/or an external database.

The logic platform 516 also includes a network interface 506 to enable communication with other machines (e.g., the cameras 530, the mats 540, scanners, databases) via, for example, one or more networks. The example network interface 506 includes any suitable type of communication interface(s) (e.g., wired and/or wireless interfaces) configured to operate in accordance with any suitable protocol(s). It should be appreciated that while FIG. 5 only depicts a single camera 530 and a single mat 540, the logic platform 516 may be in communication with any number of cameras 530 and/or mats 540.

The logic platform 516 also includes I/O interfaces 508 to enable receipt of user input and communication of output data to the user.

In some embodiments, the logic platform 516 communicates with the mat 540 to control operation thereof. For example, the logic platform 516 may instruct the mat 540 to operate in the pressure-sensing mode or the illumination mode. When instructing the mat 540 to operate in the illumination mode, the logic platform 516 may generate and transmit, via the network interface 506, an instruction that includes an identifier of the mat 540 and an indication of an illumination pattern (such as the illumination pattern 178) for use by the mat 540. In response, the mat 540 may store the illumination pattern in an illumination pattern memory 546. As described elsewhere herein, a controller of the mat 540 may then control the LEDs of the mat 540 to illuminate in accordance with the received illumination pattern.

Additionally, the logic platform 516 may also receive, via the network interface 506, pressure-change events from the mat 540 when the mat 540 operates in the pressure-sensing mode. In response to receiving a pressure-change event, the logic platform 516 may analyze the event to determine a response. For example, if the pressure-change event indicates an increase in pressure (e.g., due to an item being placed on the mat 540), the logic platform 516 may determine that the item was placed in accordance with the planogram. As another example, if the pressure-change event indicates a decrease in pressure (e.g., due to an item being removed from the mat 540), the logic platform 516 may identify the item that was removed to associate the item with a person that removed the item.

In some embodiments, the logic platform 516 communicates with the camera 530 via the network interface 506. For example, the logic platform 516 may analyze image data generated by the camera 530 in response to receiving a pressure change event. In this example, the logic platform 516 may first analyze a mat identifier included in the pressure-change event to determine that the camera 530 includes a field of view (FOV) that includes the identified mat. The logic platform 516 may then analyze the image data generated by the camera 530 to identify an item associated with the event.

More particularly, the event may indicate a particular pressure sensor of the surface of mat 540 associated with the change in pressure. Accordingly, the logic platform 516 may be configured to analyze a portion of the image data generated by the camera 530 that includes the particular pressure sensor and/or an item placed thereupon. As described herein, the logic platform 516 may perform a calibration process to generate a correspondence between the pixels of the camera 530 and physical positions at the venue 100. Accordingly, the logic platform 516 may analyze a subset of the image data generated by the camera 530 that includes the particular pressure sensor. It should be appreciated that in some embodiments, the image data analyzed by the logic platform 516 is not the latest image data generated by the camera 530, but the image data that was generated at a time that is closest to a time stamp included in the pressure-change event.

Additionally, the logic platform 516 may perform a calibration process to generate the calibration data 536 for the camera 530. The calibration data 536 may indicate a position (e.g., an X, Y, Z position at the venue 100) and heading (roll, pitch, yaw) of the camera 530. The calibration data 536 may also include other calibration parameters known in the art. Generally, the position information is fixed and stored in the planogram at the logic platform 516. However, the heading data may change over time, even in embodiments when the camera 530 is stationary. It should be appreciated that while FIG. 5 illustrates the calibration data 536 being stored at the camera 530, in some embodiments, the memory 504 may also store the calibration data.

Figure 6:
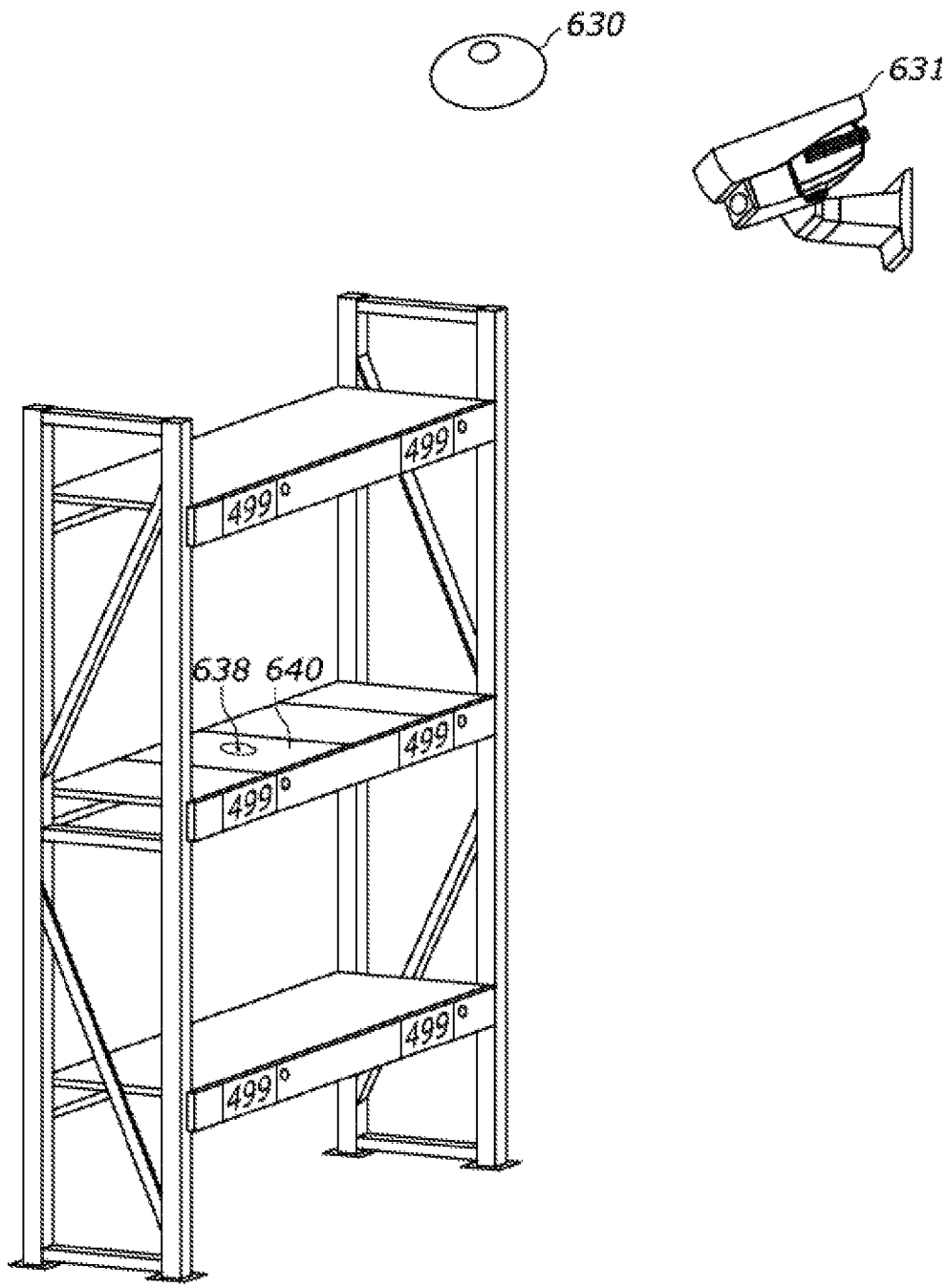
FIG. 6 illustrates a scenario for calibrating a camera using a dual-mode mat, in accordance with techniques described herein.

Turning to FIG. 6, illustrated is an example scenario for calibrating cameras 630, 631 (such as the cameras 30, 31, 530) using a dual-mode mat 640 (such as the mats 40, 140, 240, 540), in accordance with techniques described herein. In particular, the calibration techniques may be applied to determine the heading data (e.g., roll, pitch, and yaw) for the cameras 630, 631 such that a central controller (such as the central controller 16 or logic platform 516) can determine a correspondence between the pixels of the cameras 630, 631 and a position in the venue 100.

In the illustrated scenario, a central controller (such as the central controller 16 or the logic platform 516) instructs the mat 640 to illuminate in accordance with an illumination pattern 638. While FIG. 6 depicts the illumination pattern as a bullseye shape, in other embodiments, the illumination pattern may have other shapes (such as an "X," a cross, a square, a circle, or any other shape supported by the resolution of LEDs included in the surface matrix of the mat 640.

During the calibration process, the central controller may generate the illumination pattern 638 and transmit an instruction to the mat 640 that includes the illumination pattern 638. In the illustrated scenario, the center dot of the bullseye pattern 638 may be used to calibrate the cameras 630, 631. As part of the calibration process, the central controller may determine a physical position of the LED(s) that form the center dot of the bullseye pattern. To this end, the central controller may query the planogram for the venue 100 to determine an X, Y, Z coordinate for the LED(s) of the mat 640 that form the center dot of the bullseye pattern 638.

The central controller may then instruct the cameras 630, 631 to generate and transmit image data to the central controller. In response, the central controller may analyze the image data to identify a position of the illumination pattern 638 in the image data. More particularly, for the illustrated bullseye shape, the central controller may analyze the image data to identify the pixels that represent the center dot of the bullseye pattern 638. Accordingly, the central controller may then use the known X, Y, Z coordinate for the center dot of the bullseye pattern 638 and the known X, Y, Z coordinates for the cameras 630, 631 to determine the heading data for the cameras 630, 631.

Generally, heading data for a camera is determined with reference to a center pixel of the camera. Accordingly, the central controller may determine a relative position of the pixels representative of the center dot of the bullseye pattern 638 to the center pixel of the cameras 630, 631 to determine the heading data for the cameras 630, 631. To this end, the central controller may apply a geometric relationship between the relative position of the determined pixels to the center pixel and the relative position of the LEDs of the mat 640 and the cameras 630, 631 to determine the heading of the cameras 630, 631 with respect to their respective center pixels. The central controller 16 may update the calibration data maintained at the cameras 630, 631 to include the heading data.

It should be appreciated that in the scenario depicted by FIG. 6, the central controller can calibrate both of the cameras 60, 631 at approximately the same time. That is, the central controller can calibrate the cameras 630, 631 without changing the illumination characteristics of the mat 640 (or any other mat of the venue 100). Conventionally, due to a lack of precise knowledge of illumination position, camera calibration for frictionless shopping systems calibrate each camera individually. Accordingly, the instant calibration techniques enable the faster calibration of all the cameras disposed throughout the venue 100.

Figure 7:
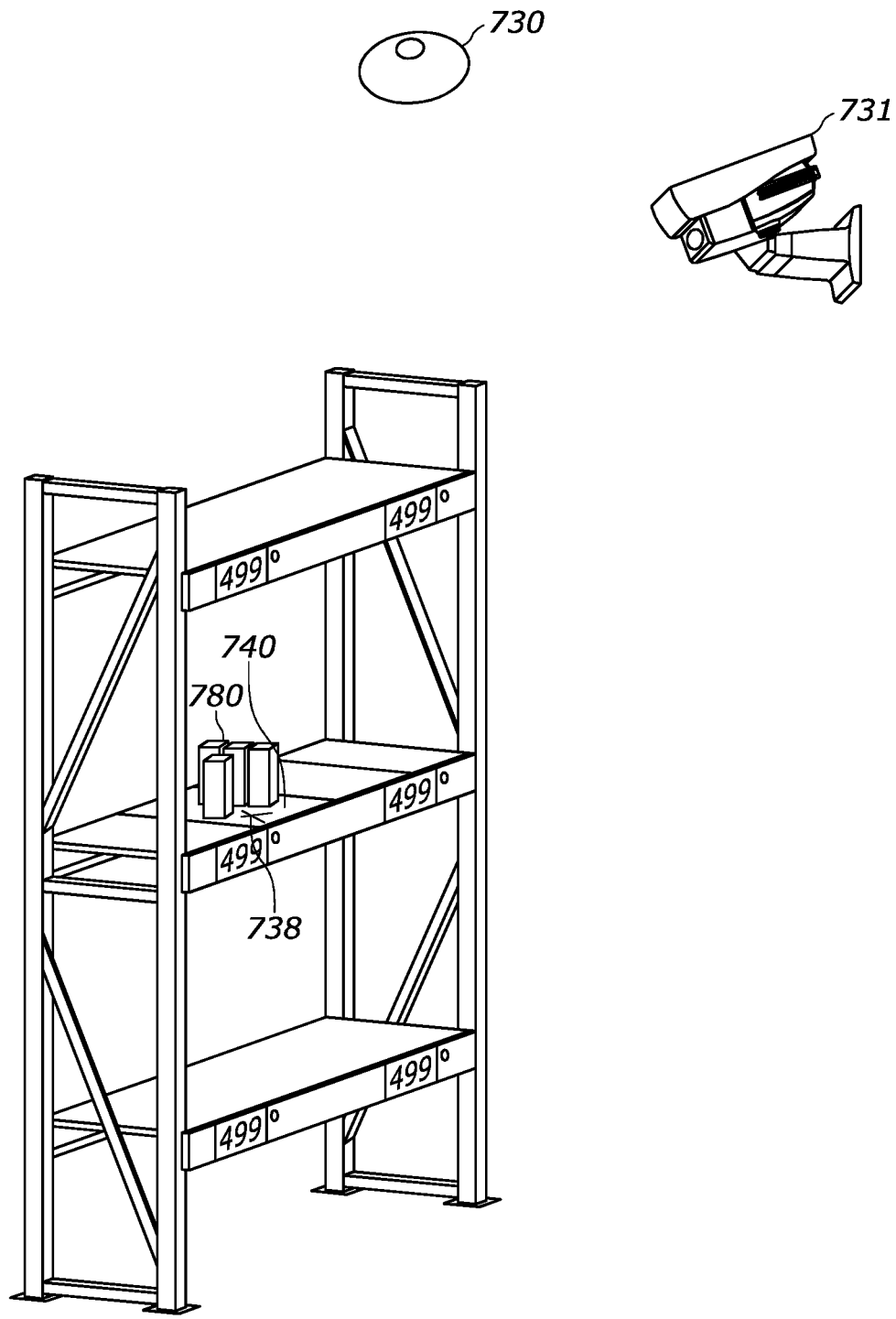
FIG. 7 illustrates a scenario for calibrating a camera using a dual-mode mat having objects placed thereupon, in accordance with techniques described herein.

FIG. 7 illustrates a scenario for calibrating cameras 730, 731 (such as the cameras 30, 31, 530, 630, 631) using a dual-mode mat 740 (such as the mats 40, 140, 240, 540, 640) having objects 780 placed thereupon. In one example, a central controller (such as the central controller 16 or the logic platform 516) may perform a recalibration process overnight or during another period of low activity at the venue 100). As another example, the central controller may perform the recalibration process in response to detecting a need to recalibrate one or both of the cameras 730, 731.

As described above, when the mat 740 is operating in the pressure-sensing mode, the mat 740 may generate and transmit, to the central controller, a pressure-change event that identifies a pressure sensor of the surface matrix of the mat 740 associated with the change in pressure. In response, the central controller analyzes image data generated by the cameras 730, 731 to identify an object associated with the pressure-change event. Accordingly, in addition to the normal processing of the image data to respond to the pressure-change event, the central controller may also confirm the calibration settings of the cameras 730, 731. In some embodiments, the central controller performs the calibration settings confirmation periodically (e.g., every 5 minutes, every hour, every 5 pressure-change events from a mat, etc.).

To confirm the settings, the central controller may first determine an expected position in the image data for the pressure sensor. To this end, the central controller may apply the current heading data stored at the cameras 730, 731 to the known X, Y, Z positions of the pressure sensor and the cameras 730, 731 to determine an expected location of the pressure sensor in the generated image data. The central controller may then compare the expected location of the pressure sensor in the image data to the actual position of the pressure sensor in the image data. If the difference is greater than a threshold accuracy metric (e.g., one inch, five pixels, 5% error, etc.), the central controller may initiate the recalibration process illustrated in FIG. 7.

Generally, the recalibration process may occur in substantially the same manner as the calibration process described with respect to FIG. 6. However, the central controller may generate the illumination pattern 738 such that the LEDs that produce the illumination are not obscured by the items 780. As one example, the central controller may analyze the pressure data generated by the mat 740 to identify a region on the mat 740 on which no objects 780 are placed. As another example, the central controller may analyze planogram data to determine the dimensions of the objects 780. The central controller may then project the field of view of the cameras 730, 731 to the mat 740 to identify a region of the mat 740 that is not blocked by objects 780 placed upon other regions of the mat 740. The central controller may then determine a shape and/or size of the illumination pattern 738 based upon the size of the unobscured region of the mat 740.

It should be appreciated that the particular LED used to calibrate the cameras 730, 731 may vary depending upon the shape of the illumination pattern. For example, in the illustrated scenario, the illumination pattern is an "X" shape. In this example, the central controller may calibrate the cameras 730, 731 using the position of the center pixel of the "X" shape. In alternate scenarios, the central controller may utilize a corner of a polygon shape, a center dot of a bullseye pattern, etc.

Example Applications of Dual-Mode Mats

Figure 8A:
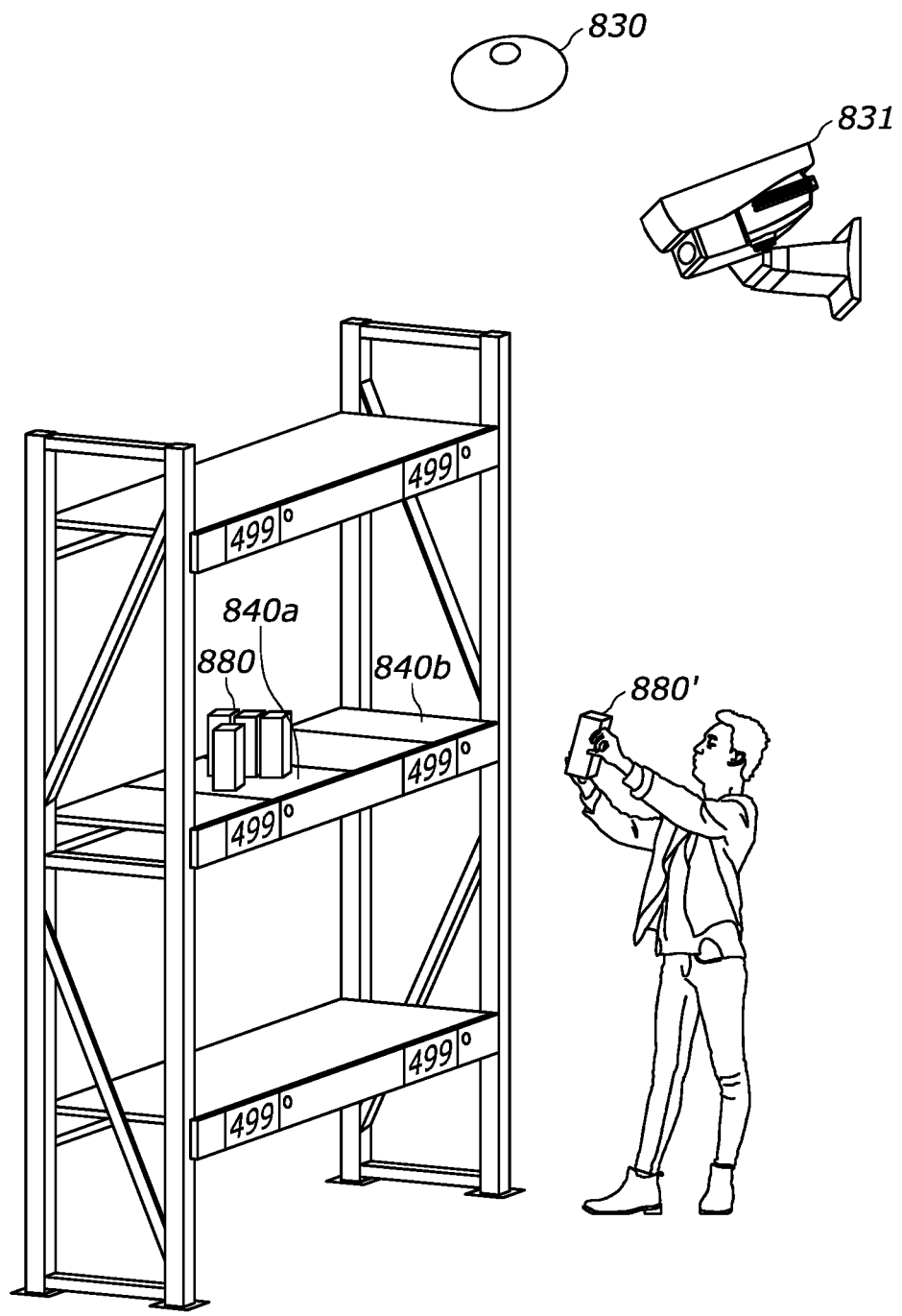
FIG. 8A illustrates a scenario for detecting that an object was removed from a dual-mode mat, in accordance with techniques described herein.

FIG. 8A illustrates a scenario for detecting that an object 880' was removed from a dual-mode mat 840a (such as one of the mats 40, 140, 240, 540, 640, 740). For example, in a frictionless shopping system, when a customer removes the object 880' from the mat 840a, the system may associate the object 880' with a list of objects pending purchase for the customer. As another example, in a warehouse object tracking system, when a worker removes the object 880' from the mat 840a, the system may update the status of the object 880' in an inventory tracking system.

As described herein, when the mat 840a is operating in the pressure-sensing mode, the mat 840a may transmit a pressure-change event to a central controller (such as the central controller 16 or the logic platform 516) in response to a person removing the object 880' from the mat 840a. The central controller may then analyze image data generated by the cameras 830, 831 (such as the cameras 30, 31, 530, 630, 631, 730, 731) to identify the object 880'. More particularly, the central controller may analyze the subset of the image data generated by the cameras 830, 831 representative of the position on the mat 840a from which the object 880' was removed. To identify this subset of image data, the central controller may apply the calibration data associated with the cameras 830, 831.

When analyzing the subset of image data, the central controller may analyze identifying features of the object 880'. For example, the central controller may identify a front label of the object 880' and/or a barcode (including a QR code) on a surface of the object 880' to identify the object 880'. In some embodiments, the central controller may confirm the identification of the object 880' by comparing the identified object to an object assigned to the mat 840a in the planogram.

Figure 8B:
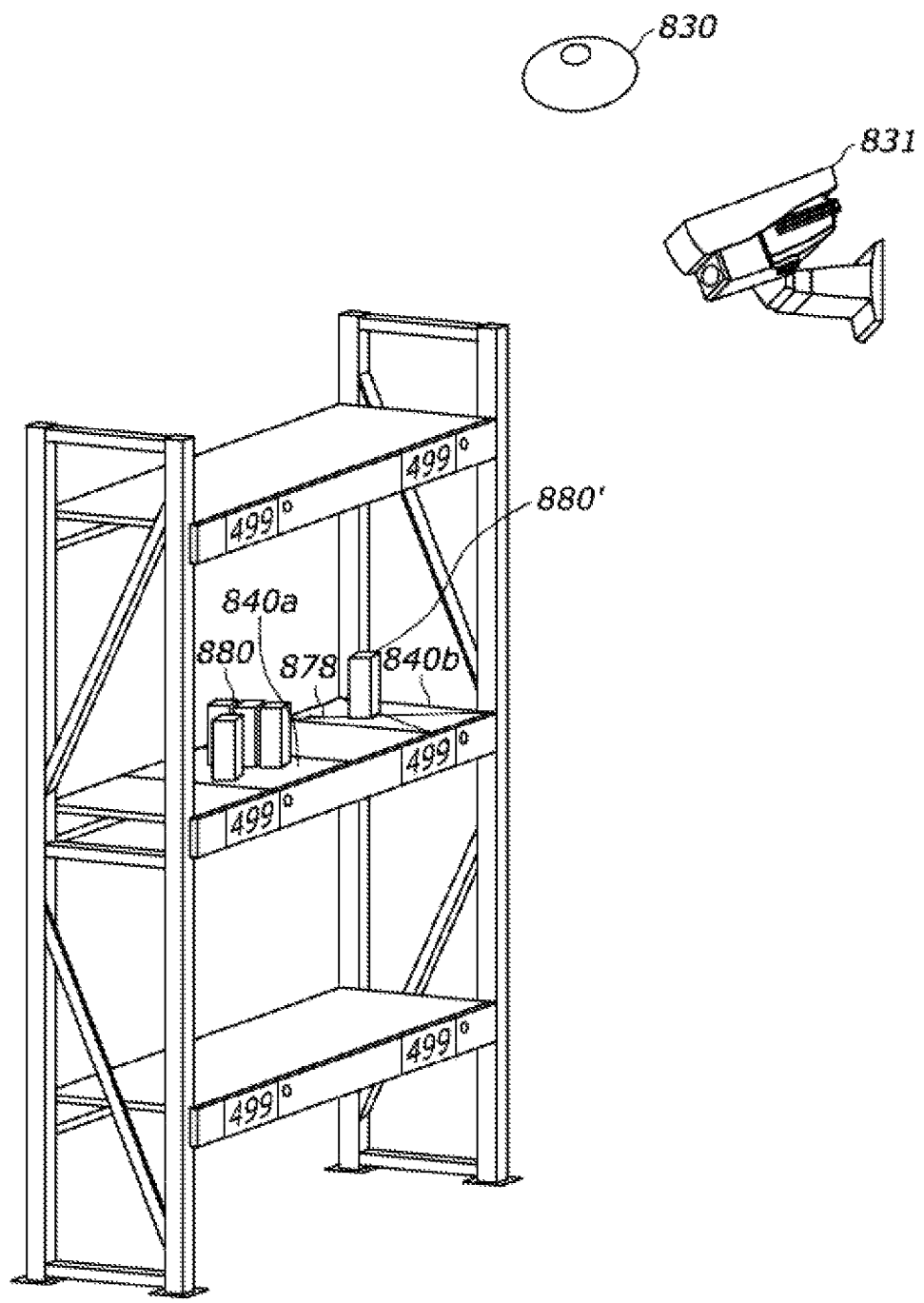
FIG. 8B illustrates a scenario for detecting that an object was mis-stocked, in accordance with techniques described herein.

FIG. 8B illustrates a scenario for detecting that the object 880' was mis-stocked. For example, the customer that picked up the object 880' in the scenario of FIG. 8A may have placed the object 880' on the mat 840b instead of the mat 840a. In an alternative scenario, the object 880' may be placed on the mat 840b by venue personnel stocking and/or restocking the shelf that includes the mats 840a-b.

As described herein, when the mat 840b is operating in the pressure-sensing mode, the mat 840b may transmit a pressure-change event to the central controller in response to the object 880' being placed on the mat 840b. In response, the central controller may analyze image data generated by the cameras 830, 831 to determine whether the object 880' was correctly stocked. More particularly, the central controller may analyze the subset of the image data generated by the cameras 830, 831 representative of the position on the mat 840b on which the object 880' was placed. To identify this subset of image data, the central controller may apply the calibration data associated with the cameras 830, 831.

The central controller may then compare the identity of the object 880' determined via the image data to the object assigned to the mat 840b to determine whether the object 880 was properly stocked. In the illustrated scenario, a different object 880 is assigned to the mat 840b causing the object 880' to be mis-stocked. In response, the central controller may cause the mat 840b to operate in the illumination mode to provide an illumination pattern 878 that indicates the presence of a mis-stocked object. In the illustrated scenario, the illumination pattern 878 is an "X" pattern. In alternate embodiments, the illumination pattern 878 may include a color (e.g., red) and/or an illumination intensity pattern (e.g., blinking on and off) to indicate to the person placing the object 880' that the object 880' was mis-stocked.

Figure 9:
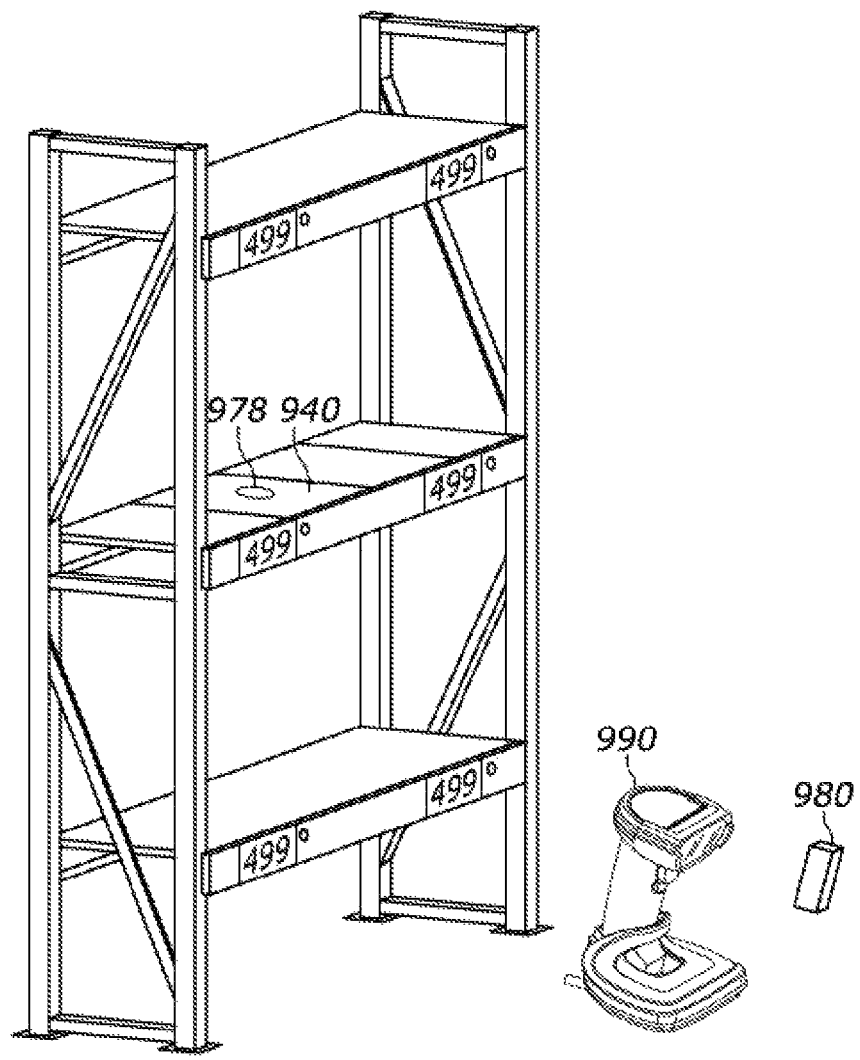
FIG. 9 illustrates a scenario for assisted restocking via a dual-mode mat, in accordance with techniques described herein.

FIG. 9 illustrates a scenario for assisted restocking via a dual-mode mat 940 (such as one of the mats 40, 140, 240, 540, 640, 740, 840). In the illustrated scenario, a stockperson may be assigned a pallet of objects to be restocked at various locations across the venue 100. Prior to stocking an object 980, the stockperson may first utilize a scanner 990 (e.g., a barcode scanner, a DPM scanner, an optical scanner, a scanner included in user equipment, etc.) to scan the object 980. The scanner 990 may be communicatively coupled to a central controller (such as the central controller 16 or the logic platform 516). Accordingly, the scanner 990 may transmit image data of a barcode associated with the object 980 to the central controller for processing. More particularly, the central controller may process the image data to decode the barcode to obtain an identifier associated with the object 980.

The central controller may then use the identifier to query the planogram for the venue 100 to determine where the object 980 is to be stocked. In the illustrated scenario, the central controller determines that the object 980 is to be stocked on the mat 940. Additionally, the central controller may determine a particular position on the mat 940 at which the object 980 is to be stocked.

The central controller may then generate an illumination pattern 978 that indicates where the object 980 is to be stocked. In the illustrated scenario, the illumination pattern 978 is a circle indicating the position on the mat 940 at which the object 980 is to be stocked. In other scenarios, the illumination pattern 978 may cause the mat 940 to illuminate in a solid color (e.g., green) to indicate that the object 980 is to be stocked on the mat 940. After generating the illumination pattern, the central controller may then transmit an instruction to the mat 940 to cause the mat 940 to operate in the illumination mode in accordance with the illumination pattern 978.

It should be appreciated that after the stockperson places the object 980, the central controller may implement the techniques described with respect to FIG. 8B to confirm that the object 980 was properly stocked.

Example Calibration Method

Figure 10:
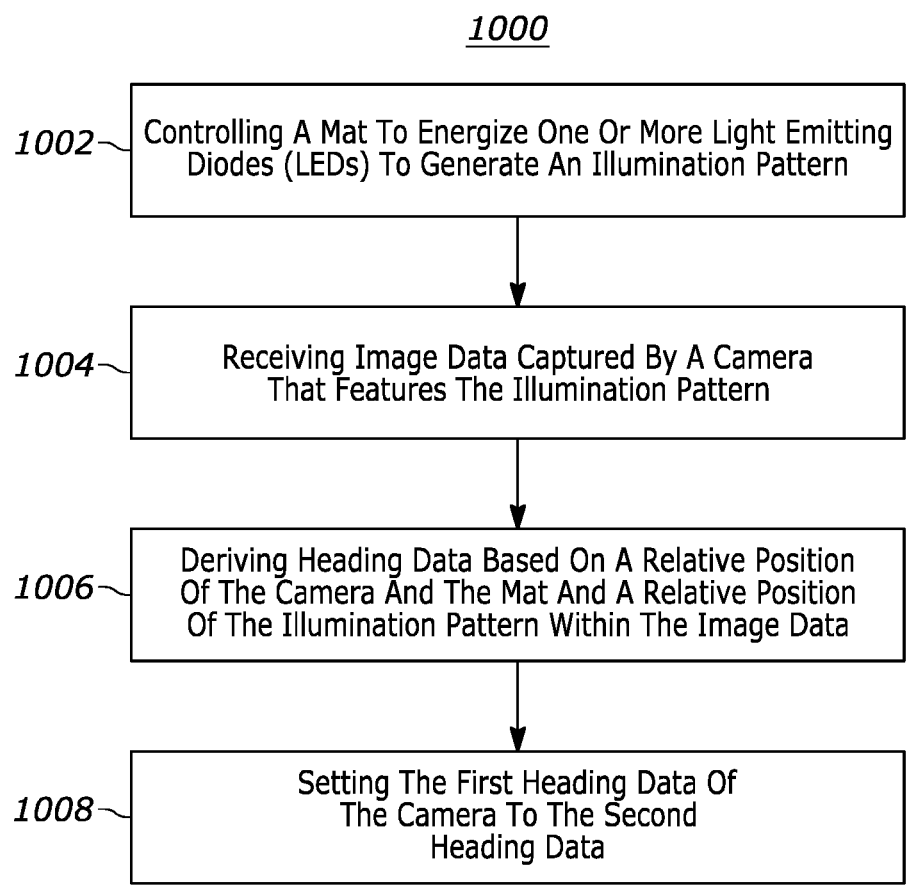
FIG. 10 illustrates an example flow diagram of a method for calibrating a camera, in accordance with techniques described herein.

FIG. 10 illustrates an example flow diagram of a method 1000 for calibrating a camera (such as the cameras 30, 31, 530, 630, 631, 730, 731, 830, 831) via a calibration system that includes a mat (such as one of the mats 40, 140, 240, 540, 640, 740, 840, 940), and a camera (such as the cameras 30, 31, 530, 630, 631, 730, 731, 830, 831) having first heading data (e.g., roll, pitch, yaw data) and a field of view featuring the mat. In some embodiments, the first heading data is default heading data for the camera. The calibration system also includes a controller (such as the central controller 16 or the logic platform 516) coupled to the mat and the camera. In some embodiments, the controller is configured to perform the method actions associated with the method 1000. Additionally, in some embodiments, the calibration system also includes a planogram database (such as a planogram stored in the memory 504 or an external planogram database) storing position data for the mat and the camera.

The method 1000 begins at block 1002 when the controller controls the mat to energize one or more light emitting diodes (LEDs) (such as the LEDS 171) to generate an illumination pattern (such as the illumination patterns 178, 638, 738). In some embodiments, the mat is configured to controllably operate in one of (i) a pressure-sensing mode, or (ii) an illumination mode. Accordingly, the controller may configure the mat to change operation from the pressure-sensing mode to the illumination mode to energize the one or more LEDs. In some embodiments, the illumination pattern may energize each of the one or more LEDs of the mat.

At block 1004, the controller receives image data captured by the camera that features the illumination pattern.

At block 1006, the controller derives second heading data based on a relative position of the camera and the mat and a relative position of the illumination pattern within the image data. In some embodiments, to determine the relative position of the illumination pattern, the controller may identify a center pixel of the camera and determine a position of the illumination pattern with respect to the center pixel of the camera. More particularly, in some embodiments, the controller determines the position of a first LED energized by the illumination pattern with respect to the center pixel of the camera. Accordingly, to derive the heading data, the controller may determine a position of the first LED based upon the stored position of the mat and compare the position of the first LED to the position of the camera.

At block 1008, the controller sets the first heading data of the camera to the second heading data. For example, the controller may update the calibration data (such as the calibration data 536) to include the second heading data.

In some embodiments, the camera is a first camera and the calibration system includes a second camera (such as the cameras 30, 31, 530, 630, 631, 730, 731, 830, 831) having third heading data and a field of view featuring the mat. In these embodiments, the controller may perform similar actions with respect to the second camera as those performed at blocks 1004-1008 with respect to the first camera. That is, the controller may (1) receive image data captured by the second camera featuring the illumination pattern, (2) derive fourth heading data based on a relative position of the second camera and the mat and a relative position of the illumination pattern within the image data, and (3) set the third heading data of the second camera to the fourth heading data.

In some embodiments, the controller configures the mat to operate in the pressure-sensing mode. When the mat operates in the pressure-sensing mode, the mat is configured to monitor sensor data generated by a matrix of pressure sensors (such as the pressure sensors 151). In these embodiments, the controller may detect a pressure event indicative of an object (such as the object 880') being placed on the mat at an indicated location. In some embodiments, the pressure event indicates a location in the matrix of pressure sensors at which a change in sensed pressure values resulted in the generation of the pressure event. In response detecting the pressure event, the controller may control the camera to capture image data featuring of the object.

Additionally, in these embodiments, the controller may (1) identify, in the captured image data featuring the object, a position of the indicated location in the matrix of pressure sensors; (2) determine an expected position of the indicated location in the captured image data based upon the second heading data; and (3) compare a difference between the identified position of the indicated location and the expected position of the indication location to a threshold. If the controller determines that the difference between the identified position of the indicated location and the expected position of the indication location exceeds the threshold, the controller may perform the method 1000 an additional time to recalibrate the camera. In some embodiments, when the controller performs the method 1000 to recalibrate the camera, the controller may determine a position of the one or more remaining objects on the mat and, based upon the determination, generate an illumination pattern that is not obscured by the one or more remaining objects.

In some embodiments, the calibration system is applied to provide stocking assistance. For example, the controller may detect a pressure event indicative of an object being placed on the mat at an indicated location, and, in response detecting the pressure event, control the camera to capture image data featuring of the object. In these embodiments, the controller may query the planogram database to identify an expected object at the indicated location and determine whether the object placed on the mat matches the expected object. If the controller determines that the object placed on the mat does not match the expected object, the controller may configure the mat to operate in the illumination mode such that the mat energizes one or more LEDs in an illumination pattern (such as the illumination pattern 878) indicative of the object placed on the mat being mis-stocked.

As another example, in some embodiments, the controller may detect an indication of an object that is to be restocked onto the mat. For example, the controller may analyze image data captured by the camera or receive an object identifier from a scanner (such as the camera and/or scanner 990). In response, the controller may query the planogram database to identify an intended location of the object and configure the mat to operate in the illumination mode such that the mat energizes one or more LEDs in an illumination pattern (such as the illumination patter 978) indicative of the intended location of the object.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

What is claimed:

1. A system for calibrating a camera, comprising
a mat;
a camera having first heading data and a field of view featuring the mat; and
a controller coupled to the mat, and the camera, the controller being configured to perform a calibration routine to calibrate the camera comprising:
controlling the mat to energize one or more light emitting diodes (LEDs) to generate an illumination pattern,
receiving image data captured by the camera that features the illumination pattern,
deriving second heading data based on a relative position of the camera and the mat and a relative position of the illumination pattern within the image data; and
setting the first heading data of the camera to the second heading data,
wherein to determine the relative position of the illumination pattern within the image data, the controller is configured to:
identify a center pixel of the camera; and
determine a position of the illumination pattern with respect to the center pixel of the camera.

2. The system of claim 1, wherein to determine the position of the illumination pattern with respect to the center pixel of the camera, the controller is configured to:
determine the position of a first LED with respect to the center pixel of the camera.

3. The system of claim 2, wherein:
the controller is coupled a database storing position data for the mat and the camera; and
to derive the heading data, the controller is configured to:
determine a position of the first LED based upon the stored position of the mat; and
compare the position of the first LED to the position of the camera.

4. The system of claim 1, wherein:
the camera is a first camera; and
the system further comprises:
a second camera having third heading data and a field of view featuring the mat.

5. The system of claim 4, wherein the calibration routine further comprises:
receiving image data captured by the second camera featuring the illumination pattern;
deriving fourth heading data based on a relative position of the second camera and the mat and a relative position of the illumination pattern within the image data; and
setting the third heading data of the second camera to the fourth heading data.

6. The system of claim 1, wherein:
the mat is configured to controllably operate in one of (i) a pressure-sensing mode, or (ii) an illumination mode; and
the calibration routine comprises:
configuring the mat to change operation from the pressure-sensing mode to the illumination mode.

7. The system of claim 6, wherein:
when the mat operates in the pressure-sensing mode, the mat is configured to monitor sensor data generated by a matrix of pressure sensors; and
the controller is configured to:
detect a pressure event indicative of an object being removed from the mat; and
in response detecting the pressure event, controlling the camera to capture image data featuring the object.

8. The system of claim 7, wherein:
the pressure event indicates a location in the matrix of pressure sensors at which a change in sensed pressure values resulted in the generation of the pressure event; and
the controller is configured to:
identify, in the captured image data featuring the object, a position of the indicated location in the matrix of pressure sensors;
determine an expected position of the indicated location in the captured image data based upon the second heading data; and
compare a difference between the identified position of the indicated location and the expected position of the indication location to a threshold.

9. The system of claim 8, wherein the controller is further configured to:
determine that the difference between the identified position of the indicated location and the expected position of the indication location exceeds the threshold; and
perform the calibration routine to recalibrate the camera.

10. The system of claim 9, wherein to perform the calibration routine to recalibrate the camera, controller is configured to:
determine a position of the one or more remaining objects on the mat;
based upon the determination, generate an illumination pattern that is not obscured by the one or more remaining objects.

11. The system of claim 9, wherein to perform the calibration routine to recalibrate the camera, controller is configured to:
generate an illumination pattern that energizes each of the one or more LEDs of the mat.

12. The system of claim 1, wherein the controller is configured to:
configure the mat to operate in a pressure-sensing mode;
detect a pressure event indicative of an object being placed on the mat at an indicated location; and
in response detecting the pressure event, control the camera to capture image data featuring of the object.

13. The system of claim 12, wherein:
the controller is coupled a database storing planogram data for the mat; and
the controller is configured to:
query the database to identify an expected object at the indicated location; and
determine whether the object placed on the mat matches the expected object.

14. The system of claim 13, wherein the controller is configured to:
determine that the object placed on the mat does not match the expected object;
configure the mat to operate in the illumination mode such that the mat energizes one or more LEDs in an illumination pattern indicative of the object placed on the mat being mis-stocked.

15. The system of claim 1, wherein:
the controller is coupled a database storing planogram data for the mat; and
the controller is configured to:
detect an indication of an object that is to be restocked onto the mat;
query the database to identify an intended location of the object; and
configure the mat to operate in the illumination mode such that the mat energizes one or more LEDs in an illumination pattern indicative of the intended location of the object.

16. The system of claim 15, wherein to detect the indication of the object, the controller is configured to:
analyze image data captured by the camera or receive an object identifier from a scanner.

17. A method for calibrating a camera via a calibration system that includes (1) a mat; (2) a camera having first heading data and a field of view featuring the mat; and (3) a controller coupled to the mat, and the camera, the method comprising:
controlling, via the controller, the mat to energize one or more light emitting diodes (LEDs) to generate an illumination pattern;
receiving, via the controller, image data captured by the camera that features the illumination pattern;
deriving, via the controller, second heading data based on a relative position of the camera and the mat and a relative position of the illumination pattern within the image data; and
setting, via the controller, the first heading data of the camera to the second heading data,
wherein determining the relative position of the illumination pattern within the image data comprises:
identifying, via the controller, a center pixel of the camera; and
determining, via the controller, a position of the illumination pattern with respect to the center pixel of the camera.

18. The method of claim 17, wherein determining the position of the illumination pattern with respect to the center pixel of the camera comprises:
determining, via the controller, the position of a first LED with respect to the center pixel of the camera.

19. The method of claim 18, wherein:
the controller is coupled a database storing position data for the mat and the camera; and deriving the heading data comprises:
determining, via the controller, a position of the first LED based upon the stored position of the mat; and
comparing, via the controller, the position of the first LED to the position of the camera.

20. The method of claim 17, wherein:
the camera is a first camera;
the calibration system includes a second camera having third heading data and a field of view featuring the mat; and
the method further comprises:
receiving, via the controller, image data captured by the second camera featuring the illumination pattern;
deriving, via the controller, fourth heading data based on a relative position of the second camera and the mat and a relative position of the illumination pattern within the image data; and
setting, via the controller, the third heading data of the second camera to the fourth heading data.

21. The method of claim 17, wherein:
the mat is configured to controllably operate in one of (i) a pressure-sensing mode, or (ii) an illumination mode; and
the method further comprises:
configuring, via the controller, the mat to change operation from the pressure-sensing mode to the illumination mode.

22. The method of claim 17, further comprising:
configuring, via the controller, the mat to operate in a pressure-sensing mode;
detecting, via the controller, a pressure event indicative of an object being placed on the mat at an indicated location; and
in response detecting the pressure event, controlling, via the controller, the camera to capture image data featuring of the object.

* * * * *